United States Patent [19]
Araujo et al.

[11] 3,784,386
[45] Jan. 8, 1974

[54] CLADDING GLASSES FOR PHOTOCHROMIC OPTICAL FIBERS

[75] Inventors: Roger J. Araujo; Loris G. Sawchuk, both of Corning, N.Y.

[73] Assignee: Corning Glass Works, Corning, N.Y.

[22] Filed: Feb. 16, 1971

[21] Appl. No.: 115,370

[52] U.S. Cl.............. 106/50, 106/54, 106/DIG. 6, 350/96 R
[51] Int. Cl....... C03c 13/00, C03c 3/08, G02b 5/14
[58] Field of Search............. 106/50, 47 Q, DIG. 6, 106/54; 313/92 LF; 350/96 R

[56] References Cited
UNITED STATES PATENTS

| | | | |
|---|---|---|---|
| 1,545,509 | 7/1925 | Montgomery et al. | 106/54 |
| 3,008,841 | 11/1961 | Tiede | 106/50 |
| 3,278,319 | 10/1966 | Cohen | 106/54 |
| 3,513,002 | 5/1970 | Labino | 106/50 |
| 3,607,322 | 9/1971 | Brady et al. | 106/50 |
| 3,630,765 | 12/1971 | Araujo | 106/DIG. 6 |
| 3,253,500 | 5/1966 | Hicks, Jr. | 350/96 B |
| 3,273,445 | 9/1966 | Siegmund | 350/96 B |

FOREIGN PATENTS OR APPLICATIONS

| | | | |
|---|---|---|---|
| 1,123,857 | 8/1968 | Great Britain | 106/53 |

*Primary Examiner*—A. B. Curtis
*Assistant Examiner*—Mark Bell
*Attorney*—Clarence R. Patty, Jr. and Clinton S. Janes, Jr.

[57] ABSTRACT

This invention relates to the discovery of glass compositions suitable for cladding photochromic optical fibers. Such glasses consist essentially, in weight percent on the oxide basis as calculated from the batch, of about 50-67 percent $SiO_2$, 5-15 percent $Al_2O_3$, 5-25 percent $B_2O_3$, 0-5 percent $P_2O_5$, 0-5 percent RO wherein RO is one or more oxides selected from the group consisting of CaO, SrO, MgO, ZnO, BaO and NiO, 0-5 percent $Li_2O$, 0-12 percent $Na_2O$, 0-10 percent $K_2O$ and 0-5 percent $Cs_2O$, wherein $[2Li_2O + Na_2O + K_2O + 1/2Cs_2O]$ is at least about 10 percent, 0-10 percent $TiO_2$ and 0-10 percent $CeO_2$, wherein $[TiO_2 + CeO_2]$ does not exceed about 10 percent, 0-0.5 percent $Sb_2O_3$ and 0-0.5 percent $As_2O_3$, to which may be added 0-15 percent F, as calculated in excess of the weight of the other glass constituents. These glasses are particularly useful because, in addition to combining proper thermal expansion and refractive index with good ultraviolet light absorption, they do not deleteriously effect the natural fading rate of the photochromic core glass during the fabrication of the cladded fiber optic.

2 Claims, 2 Drawing Figures

PATENTED JAN 8 1974        3,784,386

INVENTORS.
Roger J. Araujo
Loris G. Sawchuk
BY
*Clinton S. Janes, Jr.*
ATTORNEY

CLADDING GLASSES FOR PHOTOCHROMIC OPTICAL FIBERS

BACKGROUND OF THE INVENTION

Fiber optics is a branch of optics which makes use of the phenomenon of total internal reflection to transmit light along the length of an optically transparent fiber. This phenomenon, when combined with the ready capability of forming individual fibers into bundles, has made possible the manufacture of numerous new fiber optic devices including cathode ray tube faceplates, image intensifiers, and image dissectors. An optical fiber or light pipe comprises a core material consisting of a glass fiber of relatively high index of refraction and a glass cladding material forming a covering or sheath for the fiber which is of a lower index of refraction. The fiber traps light impinging on it within a defined critical angle of acceptance ($\theta$) and, because of total internal reflection, transmits the light down the fiber to be emitted from the output end. The critical angle of acceptance ($\theta$) as well as the Numerical Aperture (NA) of the fiber depend on the refractive indices of the core and cladding. The Numerical Aperture is a measure of a fiber optic's light gathering power and, being dependent upon the sine of the acceptance angle ($\theta$), is a function of the refractive indices of the fiber's core and cladding, as defined by the equation $NA = n_e \sin \theta = \sqrt{n_1^2 - n_2^2}$ wherein $n_e$ is the refractive index of the medium at the entrance to the fiber (with air, this value is 1), $n_1$ is the refractive index of the core and $n_2$ is the refractive index of the cladding. A diagrammatic sketch representing this description is set forth as FIG. 1 of the appended drawing.

It will be apparent from a study of the foregoing equation that the greater the Numerical Aperture a particular optical fiber possesses, the greater will be the acceptance angle at which the fiber can trap and transmit light. And, since NA is a function of the refractive indices of the core and cladding materials, it is generally true that the greater the difference between the refractive indices of the core and cladding, the greater will be the NA and, therefore, the more advantageous will be the product.

The mechanical and theoretical considerations involved in the field of fiber optics have been discussed extensively in the literature, so further explanation herein is not deemed necessary. One well-recognized discussion of this subject can be found in Appendix N of the book "Concepts of Classical Optics" by John Strong, published in 1958.

Bundles of fiber optics have been used to manufacture such information display devices as cathode ray tube faceplates, in order to provide improved image resolution. Each fiber in the bundle acts to transmit a single point source so, in general, the resolution of the total image is dependent upon the number of fibers per unit of bundle cross sectional area; the larger the number of fibers per unit area the greater the image resolution at the exit end of the bundle.

It would be highly desirable in such information display devices as cathode ray tube faceplates to employ a glass having a "memory," which could store an image impressed upon the faceplate for a considerable period of time.

A photochromic glass is one such glass, having the capability of being colored upon exposure to radiation of certain wavelengths, and made clear by cessation of the activating radiation or by exposure to radiation of a different wavelength. It can be appreciated that this property of photochromic glass strongly suggests its possible utility in memory devices. Nevertheless, while in principle all that is required for producing photochromic optical fibers is a high refractive index photochromic core glass sheathed in a low refractive index cladding, as a practical matter specific properties are required of both the photochromic core glass and the surrounding cladding glass if the photochromic capabilities of the core are to be utilized for such applications. Thus, in information display devices, the core glass must be readily darkened by exposure to one kind of radiation (usually ultraviolet) and the darkening readily erased by exposure to another kind of radiation, for example, red or infrared radiation. In addition the information imparted to the glass must persist therein for reasonable times while the glass is being read by some neutral radiation such as visible light. This persistence of information requires that the natural fading rate of the darkened glass at the temperature at which it will be used is low, that the thermal fading rate at somewhat elevated temperatures be low, and that the glass be neither substantially darkened nor bleached by the neutral or reading light.

A family of photochromic glasses suitable for use as fiber optic core glass is described in a copending U.S. Pat. application, Ser. No. 801,562 now U.S. Pat. No. 3,630,765, commonly assigned herewith. Those glasses exhibit a refractive index higher than about 1.56 so as to be effective as a core material for a fiber optic, and in addition demonstrate good photochromic properties including high darkening and bleaching sensitivity and low natural fade rate.

The efficiency of fiber optic display systems is dependent not only on the photochromic qualities of the core glass, but also on the characteristics of the cladding glass. The cladding should preferably be of as low a refractive index as possible to increase the Numerical Aperture and thus the light gathering power of the fiber optic. In addition, the cladding should have a fairly low coefficient of thermal expansion. A high coefficient of thermal expansion (relative to that of the core glass) often leads to poor bonding and crazing of the cladding during fiber manufacture. And finally, it has been found that improvements in resolution can be obtained if the cladding glass can be made to absorb any activating radiation which escapes from the fiber optic core or is not originally trapped by it. This stray radiation, is not absorbed, results in "cross talk" among neighboring fibers. This occurs whenever radiation from a point source which is intended to be transmitted down one fiber is partially transmitted along several neighboring fibers as well, thus causing a blurring of the image. Unfortunately, we have found that many of the types of glasses which would ordinarily be considered suitable for use as a fiber optic cladding material from considerations as to refractive index and thermal expansion have a deleterious effect on the properties of the photochromic core glass as the result of a chemical interaction between the core and cladding during the forming of the finished cladded fiber.

Accordingly, it is the principle object of the present invention to provide a family of glasses which can be used to clad photochromic cores without a deleterious effect on the photochromic properties thereof.

A further object of the invention is to provide cladding glasses which will actually increase the resolving capability of photochromic optical fiber display systems by minimizing ultraviolet activating radiation "cross talk" which occurs be-tween neighboring fibers in such systems.

Other objects and advantages of the present invention will become apparent from the following detailed description thereof, and from the appended drawing wherein FIG. 1 represents a fiber optic of the type which might incorporate the glasses of the present invention and FIG. 2 represents a preferred configuration for an extramural absorbing fiber optic utilizing the glasses of the present invention.

SUMMARY OF THE INVENTION

Briefly, our invention stems from the discovery that the photochromic properties of an optical fiber are affected not only by the chemical composition of the photochromic core, but also by the composition of the cladding glass which is not photochromic itself. In particular, the natural fading rate of photochromic glasses is increased by the process of drawing optical fibers unless the glasses used for the cladding are highly alkaline. Obtaining the high alkalinity required for the desired low natural fading rate requires not only that comparatively high concentrations of alkali oxides be added to the glass batch, but also that the concentration of acidic oxides such as $B_2O_3$ or $P_2O_5$ be kept low. Normally, low alkali levels are used in cladding glasses so that the thermal expansion coefficient can be kept low, and poor bonding and crazing avoided. Thus, overcoming the problem of deleterious effects on photochromic properties of glasses during fiber optic manufacture requires cladding glasses in a composition area normally avoided in the production of fiber optics.

While the primary objects of the invention refer to the effects of cladding glass composition on the photochromism of the core glass, it must be appreciated that such physical properties as the softening point and the thermal expansion must still be controlled. As previously noted, if the expansion of the cladding glass exceeds that of the core by too great an amount, crazing occurs during the attempt to draw fibers and the fabrication of an optical fiber becomes difficult or impossible. The softening point of the cladding should not exceed that of the core glass so that excessive working temperatures are not required. Finally, it must be appreciated that the refractive index of the cladding should be kept as low as practical, in order that the acceptance angle of the system be as large as possible.

We have found an area of alkali boroaluminosilicate glass composition which can be used to fabricate cladding glasses of acceptable thermal and physical properties which do not deleteriously affect the properties of photochromic core glasses during the manufacturing process. These compositions optionally contain certain additives which impart to the glass the property of good ultraviolet absorptivity. The base glasses consist essentially, in weight percent on the oxide basis as calculated from the batch, of about 50–67 percent $SiO_2$, 5–15 percent $Al_2O_3$, 5–25 percent $B_2O_3$, 0–5 percent $Li_2O$, 0–12 percent $Na_2O$, 0–10 percent $K_2O$, and 0–5 percent $Cs_2O$, wherein [$2Li_2O + Na_2O + K_2O + 1/2Cs_2O$] totals at least about 10 percent.

As previously explained, improvements in resolution can be achieved by utilizing a cladding glass that absorbs the activating ultraviolet light. Good ultraviolet absorption is afforded by iron oxide, titanium oxide, and cerium oxide, but of these three iron oxide is the least preferred because its absorption extends throughout the visible and could, therefore, interfere with attempts to bleach the photochromic core glass with visible radiation. Where ultraviolet absorptivity is required of the cladding, then, we have found that the above-described compositions may additionally contain, in weight percent on the oxide basis as calculated from the batch, up to about 10 percent of oxides selected in the indicated proportions from the group consisting of 0–10 percent $CeO_2$ and 0–10 percent $TiO_2$.

These glass compositions may additionally include, as optional constituents, in weight percent on the oxide basis as calculated from the batch, 0–5 percent $P_2O_5$, a total of 0–5 percent of oxides selected from the group consisting of CaO, SrO, MgO, ZnO, BaO, and NiO, 0–0.5 percent $Sb_2O_3$, and 0–0.5 percent $As_2O_3$. Additions of up to about 15 percent F by weight, as calculated in excess of the weight of the other glass constituents, are useful in lowering the refractive index of the glass. However, when the calculated fluoride content exceeds about 5 percent the effect on the expansion coefficient becomes noticeable, and at levels in excess of 15 percent, the detrimental effect on the expansion coefficient outweighs the beneficial effect on the refractive index.

The level of lithia plus soda should be kept as high as possible in order that the thermal fade rate as well as the natural fade rate of the cladded core glass be kept as low as possible. The upper limit is imposed by the expansion coefficient of the glass. The phosphorus level should be kept low to minimize the growth of cerium or titanium phosphates during the various fabrication steps. The divalent metal oxides can be used in small amounts to help stabilize the cladding glass with respect to devitrification but the total amount should be kept low lest it influence the expansion coefficient unduly.

The limits on alumina are fairly well determined by the tendncy of the glass to devitrify. When the alumina is less tendency about 5 percent, cristobalite growth is difficult to avoid; when the alumina concentration exceeds about 15 percent, eucryptite and spodumene growth become a problem. Boron oxide is useful, for it helps to determine the softness of the glass and it also tends to increase the ultraviolet absorbance of the $CeO_2$; however, high concentrations of boron oxide have a deleterious effect on the thermal fading rate of the optical fiber.

Minor impurities of other compounds can be tolerated unless they introduce long wave length absorption. For example, iron or cobalt oxide impurites should be kept lower than about 0.1 percent by weight.

DESCRIPTION OF THE PREFERRED EMBODIMENTS

Figure 1:
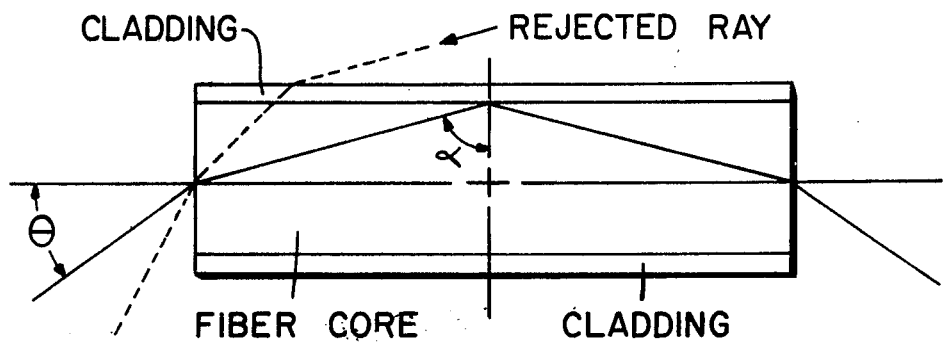

Fiber optics incorporating the glasses of the prsent invention as cladding materials will ordinarily be of a configuration corresponding to that of FIG. 1. Thus, the fiber comprises a photochromic core glass of refractive index preferably greater than about 1.60 and a single cladding material of refractive index preferably lower than about 1.52. In cases where these fibers are to be bundled to form, for example, a fiber optic faceplate for a cathode ray tube, the cladding material should be of a composition which absorbs stray ultraviolet activating radiation, so that "cross talk" with its concomitant detrimental effect on resolution will be minimized. However, the amount of ultraviolet absorption which can be practically introduced into the cladding glass in order to improve resolution is severely limited because a highly absorbing cladding decreases the darkening efficiency of the activating ultraviolet radiation. This decrease in darkening efficiency is due to the fact that ultraviolet light rays are attenuated by a reflection from an absorbing cladding even though the rays are nominally within the acceptance angle of the optical fiber. This attenuation is due to the finite penetration or tunneling of the light wave into the cladding glass on every reflection. Because of this attenuation, a level of absorption which provides an acceptable compromise between darkening sensitivity and high resolution must be chosen. Thus, while glasses within the aforementioned composition limits will be generally useful for the purposes of the invention, preferred compositions for claddings providing fibers with both good darkening sensitivity and high resolution are obtained within the following somewhat narrower range:

$SiO_2$ — 55–65%
$Al_2O_3$ — 5–10%
$B_2O_3$ — 12–18%
$Na_2O$ — 6–10%
$Li_2O$ — 0–3%
$TiO_2$ — 3–7 %
$CeO_2$ — 4–9 %
F — 0–5 %
$Sb_2O_3$ — 0.2–0.5%
$Cs_2O$ — 0–2.0%
NiO — 0–3.0%

The fluorine content is expressed as percent by weight in excess of the total weight of the other composition constituents. Especially preferred are glasses within the following range:

$SiO_2$ — 60–65%
$Al_2O_3$ — 5–6 %
$B_2O_3$ — 14–16%
$Na_2O$ — 7–8 %
$Li_2O$ — 1–2 %
$CeO_2$ — 6–8.5%
$Sb_2O_3$ — 0.2%
$Cs_2O$ — 0–0.5%

Cladding glasses of these compositions will actually cause the cladded photochromic glass to show a lower thermal fade rate than does the unclad glass.

Figure 2:
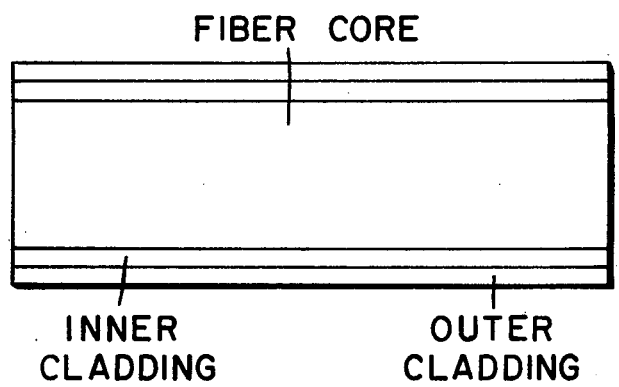

The need to compromise on cladding composition in order to obtain both good darkening sensitivity and high resolution can be avoided by fabricating an optical fiber of the configuration of FIG. 2 of the drawing. Such a fiber has two claddings enclosing the photochromic glass core: an inner cladding which has no appreciable ultraviolet absorption and an outer cladding which is highly absorbing in the ultraviolet. An optical fiber so constructed is called an extramural absorbing fiber. It demonstrates good darkening sensitivity because radiation within the acceptance angle is not attenuated by tunneling through the non-absorbing inner cladding at each reflection from the core-inner cladding interface, and it demonstrates good resolution because radiation outside the acceptance angle which traverses the inner cladding is absorbed as it enters the highly-absorptive outer cladding.

For use as an inner cladding, any of the glasses previously discussed which contain either no cerium or titanium oxides or, at most, small amounts of these materials are suitable. The following compositions, expressed in weight percent on the oxide basis as calculated from the batch, are preferred:

$SiO_2$ — 60–67%
$Al_2O_3$ — 5–10%
$B_2O_3$ — 12–18%
$Na_2O$ — 7–10%
$Li_2O$ — 1–2 %
CaO — 0–3 %
$Cs_2O$ — 0–2 %
$Sb_2O_3$ — 0.2–0.5%

Examples of suitable outer cladding materials for extramural absorbing fibers include those aforementioned glasses having high concentrations of cerium or titanium oxides. Glasses containing at least about 7 percent by weight of cerium are preferred.

Table I lists some examples of cladding glasses which are operable in the invention. The compositions are shown in weight percent on the oxide basis as calculated from the batch, with fluorine content expressed as amount in excess of the other glass constituents. The individual batch ingredients may comprise any materials, whether oxides or other compounds, which, on being melted together, are converted to the desired oxide composition in the proper proportions.

TABLE I

| | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| $SiO_2$ | 60.8 | 63.4 | 63.0 | 65.0 | 65.5 | 64.8 | 66.5 | 65.0 | 63.0 | 57.5 | 55.3 | 56.1 | 59.8 | 51.2 |
| $Al_2O_3$ | 10.8 | 8.9 | 5.0 | 7.0 | 8.5 | 7.0 | 5.0 | 5.1 | 5.0 | 12.4 | 7.0 | 12.0 | 5.0 | 11.0 |
| $B_2O_3$ | 15.5 | 15.0 | 15.0 | 15.0 | 15.0 | 15.0 | 15.0 | 15.0 | 15.4 | 15.0 | 11.8 | 20.0 | 11.5 | 15.0 | 17.6 |
| $Na_2O$ | 8.2 | 4.0 | 8.5 | 8.5 | 11.0 | 6.5 | 8.5 | 8.6 | 7.5 | 5.8 | 6.5 | 11.8 | 6.5 | 4.5 |
| $Li_2O$ | 3.8 | 0.75 | 1.5 | 1.5 | | 1.5 | 1.5 | 1.5 | 1.5 | 3.5 | 2.5 | | 1.5 | 3.1 |
| $K_2O$ | 0.4 | 8.25 | | | | | | | | | | | 2.0 | 0.4 |
| $Cs_2O$ | | | 0.5 | | | 5.0 | 0.5 | 0.5 | 0.5 | | | | | |
| $TiO_2$ | | | | | | | | | | | | | 2.5 | 10.0 |
| $CeO_2$ | | | | | | | | 3.8 | 7.5 | 8.4 | 8.5 | 8.2 | 5.0 | |
| CaO | | | | | | | 3.0 | | | | | | 2.5 | |
| MgO | | | | 3.0 | | | | | | | | | | |
| ZnO | | | | | | | | | | | | | | 1.0 |
| NiO | | | | 5.0 | | | | | | | | | | |
| $As_2O_3$ | .2 | | | | | | | | | 0.2 | | | | |
| $Sb_2O_3$ | | .2 | .2 | 0.2 | 0.2 | 0.2 | .2 | .2 | .2 | | 0.2 | 0.2 | 0.2 | .2 |
| F | .5 | 1.0 | | | | | | | | | | | | |

These compositions are all characterizable as high-alkali cladding glasses, but they vary widely in ultraviolet absorptivity. Thus, Examples 1–7 are clear glasses which would be particularly suitable as inner cladding glasses for extramural absorbing fibers; Example 8 is slightly absorbing and could be used as an inner cladding or as the sole cladding material; Example 9 is a preferred composition for use as a single cladding material; Examples 10–12 could be used as single claddings or as outer claddings for extramural absorbing fibers; and Examples 13 and 14 are preferably employed as outer claddings for extramural fibers.

Glasses of these compositions may be melted and formed according to conventional glass-working techniques. Thus, they may be melted, for example, in pots or crucibles at temperatures ranging from about 1,400°–1,550° C. for periods of from 4–8 hours, and subsequently formed by pressing, rolling, blowing, molding, or the like. They may then be annealed at temperatures ranging from about 475°–550° C.

The effect of the high alkali claddings of the present invention on the natural fading rate of photochromic core glasses was determined by preparing photochromic optical fibers cladded with the glasses of the invention and with prior art claddings. Each fiber optic sample was darkened by exposure to 25 millijoules of ultraviolet radiation and the fading measured in the 5-minute internal after irradiation was stopped. This loss of darkening or fading is termed percent natural fade. Two different photochromic core glasses were employed, one having 4 percent natural fade and the other 11 percent natural fade in a 5-minute interval in the uncladded state. Table II shows the effect of each of three prior art cladding glasses and three claddings of the invention on the natural fading rate of these photochromic core glasses. The effect of each cladding is shown as the number of percentage points increase (or decrease) in the 5-minute natural fade of the core caused by the use of the particular composition as a cladding material. Compositions are expressed in weight percent on the oxide basis as calculated from the batch.

TABLE II

|  | 1 | 9 | 10 | 15 | 16 | 17 |
|---|---|---|---|---|---|---|
| $SiO_2$ | 60.8 | 63.0 | 57.5 | 59.0 | 61.5 | 62.8 |
| $Al_2O_3$ | 10.8 | 5.0 | 12.4 | 10.5 | 11.0 | 5.0 |
| $B_2O_3$ | 15.5 | 15.0 | 11.8 | 20.0 | 20.8 | 26.7 |
| $Na_2O$ | 8.2 | 7.5 | 5.8 | 1.7 | 1.8 | 0.6 |
| $Li_2O$ | 3.8 | 1.5 | 3.5 | 3.0 | 3.8 | 2.2 |
| $K_2O$ | 0.4 | – | – | – | 0.4 | – |
| $Cs_2O$ | – | 0.5 | – | – | – | – |
| $CeO_2$ | – | 7.5 | 8.4 | 7.0 | – | – |
| $CaO$ | – | – | – | – | – | 0.44 |
| $As_2O_3$ | 0.2 | – | 0.2 | 0.2 | 0.2 | – |
| $Sb_2O_3$ | – | 0.2 | – | – | – | – |
| F | – | – | – | – | 0.5 | 4.0 |
| Change in % Fade | none | –4 | none | +8 | +17 | +31 |

From the above data, it can readily be seen that compositions, 1, 9, and 10, which are representative of the glasses of the invention as taken from Table I, demonstrate little effect on the fading rate of photochromic core glasses, and in some cases (viz., Example 9) actually reduce the actual fading rate thereof. On the other hand, Examples 15–17 markedly increase the fading rate of photochromic core glasses, and are therefore unsatisfactory for the purpose of manufacturing image-storing fiber optic devices using photochromic glass. Example 17, which is quite typical of glasses commonly used in cladding ordinary fiber optics, is particularly unsuitable for the purpose of this invention.

We claim:

1. In a photochromic fiber optic having a photochromic glass core of refractive index greater than about 1.56 and a glass cladding of a lower index of refraction forming a sheath for said core, the improvement which comprises a glass cladding consisting essentially, in weight percent on the oxide basis as calculated from the batch, of about 55–65 percent $SiO_2$, 5–10 percent $Al_2O_3$, 12–18 percent $B_2O_3$, 6–10 percent $Na_2O$, 0–3 percent $Li_2O$, 0–2.0 percent $Cs_2O$, 0–3.0 percent NiO, 3–7 percent $TiO_2$, 4–9 percent $CeO_2$, 0.2–0.5 percent $Sb_2O_3$, and up to about 5 percent F as calculated in excess of the weight of the other glass constituents.

2. In a photochromic fiber optic having a photochromic glass core of refractive index greater than about 1.56 and a glass cladding of a lower index of refraction forming a sheath for said core, the improvement which comprises a glass cladding consisting essentially, in weight percent on the oxide basis as calculated from the batch, of about 60–65 percent $SiO_2$, 5–6 percent $Al_2O_3$, 14–16 percent $B_2O_3$, 7–8 percent $Na_2O$, 1–2 percent $Li_2O$, 0–0.5 percent $Cs_2O$, 6–8.5 percent $CeO_2$ and 0.2 percent $Sb_2O_3$.

* * * * *